J. WELLS.
GAS PRODUCER.
APPLICATION FILED NOV. 1, 1919.

1,422,643.

Patented July 11, 1922
2 SHEETS—SHEET 1.

Inventor:
John Wells
by Wilkinson & Giusta.
Attorneys.

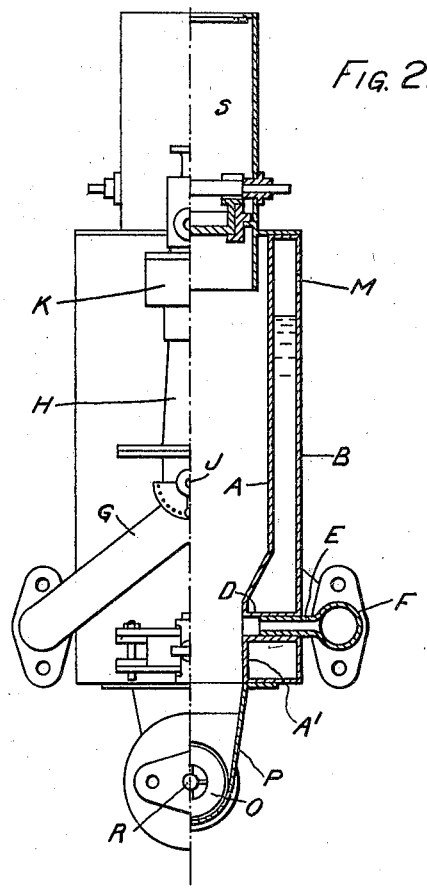

UNITED STATES PATENT OFFICE.

JOHN WELLS, OF CAIRO, EGYPT.

GAS PRODUCER.

1,422,643.  Specification of Letters Patent.  Patented July 11, 1922.

Application filed November 1, 1919. Serial No. 335,079.

*To all whom it may concern:*

Be it known that I, JOHN WELLS, a subject of the King of Great Britain, of 36 Sharia Falaki, in the city of Cairo, Egypt, have invented new and useful Improvements in Gas Producers, of which the following is a specification.

This invention relates to gas producers.

According to this invention, the producer is made with an inner and an outer shell, of iron plate or other suitable material, the space between these shells being adapted to receive water serving to cool the producer and also to cool the inlet-tubes or twyers whereby air is introduced into the body of a producer. These inlet-tubes or twyers are supplied with air through a manifold in any suitable manner, for example, the air may be delivered into the manifold by means of an injector actuated by a pressure jet from the exhaust of the engine.

An auxiliary fan may also be connected to the manifold to supply air thereto before the injector is in operation, i. e., in order to start the plant in operation, means being also provided for closing off the fan passages when the injector is in operation and for closing off the injector-passages when the fan is in operation.

The air drawn in by the injector may be advantageously caused to pass over the surface of the water in the space between the inner and outer shells, so as to carry with it the steam generated from such water by the heat of the producer. In this case, the outer shell may be provided with air-admission apertures at its upper part. Or the space between the inner and outer shells may be sealed so as to form a boiler, the steam from which forms the pressure fluid for an injector whereby air is introduced into the manifold.

In the accompanying drawing:—

Figure 1:
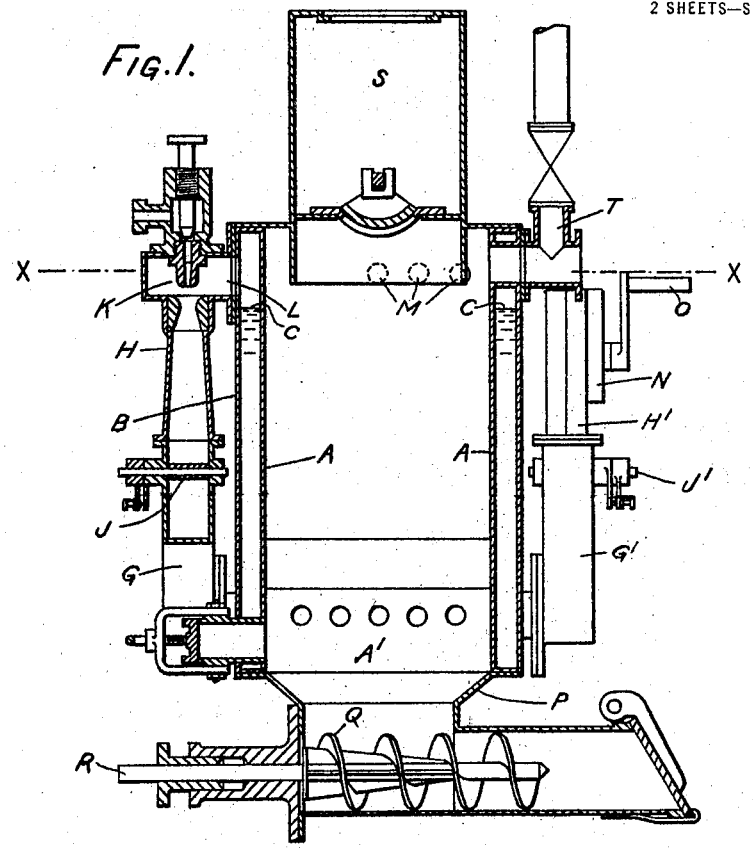

Fig. 1. is a vertical central section of a gas producer constructed according to my invention.

Fig. 2. is a side elevation of the same partly in vertical central section, and

Figure 3:
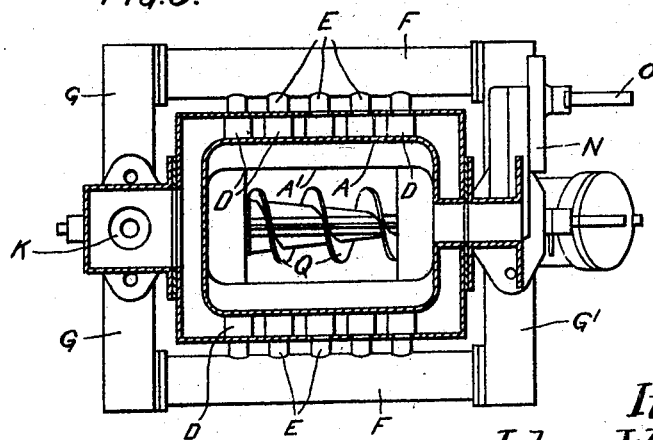

Fig. 3. a horizontal section on the line XX, Fig. 1.

The body of the producer comprises an inner shell A and an outer shell B, of iron plate. These shells are here shown of rectangular cross-section; they may however, be of circular or other suitable cross-section. The corners of the inner shell A are rounded to prevent creeping upward of untransformed gases in the angles which would otherwise be present. The annular space between the shells A, B, is adapted to receive water as indicated at C.

Through the lower part of this annular space there extend tubes D, D, which open into the contracted lower part A' of the inner shell A, and into which fit twyers E, E, mounted on air-manifolds F, F. The tubes D, D, being surrounded with water are not liable to damage from overheating.

Air is supplied to the manifolds F, F, on one side through downtakes G, G, H, controlled by a valve or damper J and supplied by an injector K, the pressure fluid for which is formed, e. g., by exhaust gases from the engine, by steam from a steam boiler, or by compressed air from a tank or other source of supply. The air drawn in by the injector K enters the injector casing from the upper part of the annular space between the shells A, B, through an aperture L, in the outer casing B, into which it passes through apertures M, M, so as to carry with it water-vapour from the upper surface of the heater water C. If desired, the annular space between the shells A, B, can be closed and the steam generated therein used as the pressure fluid for the injector K.

In order to start the gas-producer, the other ends of the manifolds F, F, are connected through downtakes G' G', H' and a damper J' to the delivery of a fan N which may be operated by hand through a crank O and suitable gearing.

When the fan N is in use, the downtake tube H of the injector is closed by the valve J, and when the injector K is in use, the down take tube H' of the fan N is closed by the valve J'.

The air necessary for the maintenance of fire conditions within the producer body may be maintained, (1) by the suction of the engine drawing in air and vapour from the injector or from the fan, or (2) by air injected by the manipulation of the fan or (3) by the air and vapour injected by the injector operated under control from the exhaust pipe of the engine or by the exhaust pressure of the engine.

The bottom P, of the producer body is fitted with a worm conveyor Q operated through a shaft R, driven mechanically or by hand. This ash-discharge may if desired be arranged in a water seal or trap. The body of the producer is also fitted with a feed hopper S and with a gas outlet T. If desired, the feed hopper S may be provided with a conveyor similar to that Q used for removing the ashes.

What I claim as my invention and desire to secure by Letters Patent is:—

1. In a gas producer, a body comprising inner and outer shells forming a space adapted to receive water, a plurality of tubes carried at opposite sides of the body and extending through said space and terminating in the inner and outer shells, twyers mounted in said tubes, air manifolds arranged at opposite sides of the body and connected to said twyers for feeding air to the interior of the body, and means for controlling the supply of air through the twyers.

2. In a gas producer, a body composed of inner and outer shells providing a water jacket there-between, twyers extending through the water jacket, air manifolds connected to the twyers for supplying air thereto, means for feeding air under pressure to said air manifolds, and means associated with the manifolds for controlling the flow of air therethrough.

JOHN WELLS